United States Patent
Taylor et al.

(10) Patent No.: US 9,258,335 B1
(45) Date of Patent: Feb. 9, 2016

(54) CONNECTION-AGGREGATION PROXY SERVICE

(71) Applicants: Brett R. Taylor, Seattle, WA (US); Samuel J. Young, Seattle, WA (US); Ranganath Atreya, Seattle, WA (US); Peter F. Hill, Seattle, WA (US); Ameet N. Vaswani, Seattle, WA (US); David A. Killian, Seattle, WA (US); Ivan King Yu Sham, Seattle, WA (US)

(72) Inventors: Brett R. Taylor, Seattle, WA (US); Samuel J. Young, Seattle, WA (US); Ranganath Atreya, Seattle, WA (US); Peter F. Hill, Seattle, WA (US); Ameet N. Vaswani, Seattle, WA (US); David A. Killian, Seattle, WA (US); Ivan King Yu Sham, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 358 days.

(21) Appl. No.: 13/621,791

(22) Filed: Sep. 17, 2012

(51) Int. Cl.
*G06F 15/16* (2006.01)
*H04L 29/06* (2006.01)
*H04W 4/00* (2009.01)
*H04L 29/08* (2006.01)
*H04L 12/801* (2013.01)

(52) U.S. Cl.
CPC .......... *H04L 65/1069* (2013.01); *H04L 47/10* (2013.01); *H04L 67/2828* (2013.01); *H04W 4/006* (2013.01)

(58) Field of Classification Search
None
See application file for complete search history.

(56) References Cited

U.S. PATENT DOCUMENTS

| 6,975,647 | B2 | 12/2005 | Neale et al. |
| 7,184,420 | B2 | 2/2007 | Son et al. |
| 7,266,683 | B1 * | 9/2007 | Nag ............ H04L 63/0428 380/217 |

(Continued)

*Primary Examiner* — Mohamed Ibrahim
*Assistant Examiner* — James Fiorillo
(74) *Attorney, Agent, or Firm* — Knobbe, Martens, Olson & Bear, LLP

(57) ABSTRACT

A connection-aggregation proxy service disclosed in various embodiments receives connection requests from a plurality of local initiating services, where the connection requests are not targeted at the connection-aggregation proxy service. The connection-aggregation proxy service establishes connections with the local initiating services, receives packets over those connections, and transmits the packets across the same connection when the packets are for the same external target. A local connection-aggregation proxy service in one example executes on the same physical computing device as the local initiating services. A gateway connection-aggregation proxy service in another example resides at a network edge between the local initiating services and the external target that the network local initiating services are requesting. In yet another example, a central connection-aggregation proxy service establishes a connection with multiple local connection-proxy aggregation services and acts as an upstream aggregator for the connections from those local connection-aggregation proxy services.

28 Claims, 8 Drawing Sheets

(56) References Cited

U.S. PATENT DOCUMENTS

| | | | |
|---|---|---|---|
| 7,277,963 B2 | 10/2007 | Dolson et al. | |
| 7,394,788 B2 | 7/2008 | Kim et al. | |
| 7,526,482 B2 * | 4/2009 | Edwards | G06F 9/54 |
| 7,882,237 B2 | 2/2011 | Fischofer | |
| 8,090,866 B1 | 1/2012 | Bashyam et al. | |
| 8,203,949 B1 | 6/2012 | Helmy et al. | |
| 2003/0005455 A1 * | 1/2003 | Bowers | H04N 7/17336 725/90 |
| 2004/0015591 A1 * | 1/2004 | Wang | H04L 47/10 709/228 |
| 2005/0086300 A1 * | 4/2005 | Yeager | G06F 9/544 709/204 |
| 2006/0062206 A1 * | 3/2006 | Krishnaswamy | H04L 12/2856 370/352 |
| 2007/0186108 A1 * | 8/2007 | Passarella | H04L 61/2015 713/171 |
| 2008/0256232 A1 * | 10/2008 | Fleury | H04L 12/2805 709/224 |
| 2010/0220250 A1 * | 9/2010 | Vanderwall | G01C 11/02 348/837 |
| 2012/0185569 A1 * | 7/2012 | Das | H04W 4/006 709/219 |
| 2012/0254417 A1 * | 10/2012 | Luna | H04L 67/2828 709/224 |
| 2012/0317234 A1 * | 12/2012 | Bohrer | H04W 4/00 709/219 |
| 2013/0111038 A1 * | 5/2013 | Girard | H04L 45/245 709/226 |

* cited by examiner

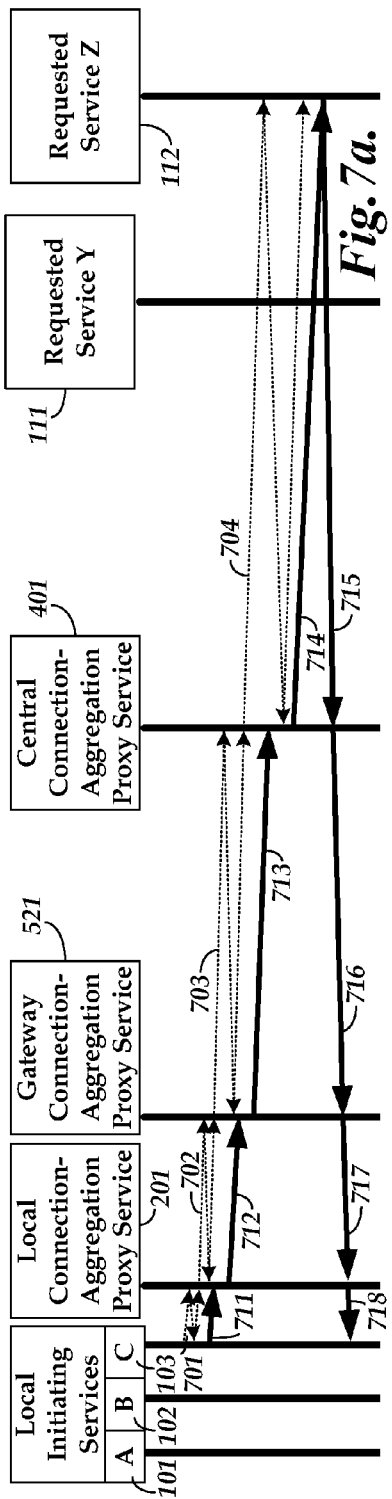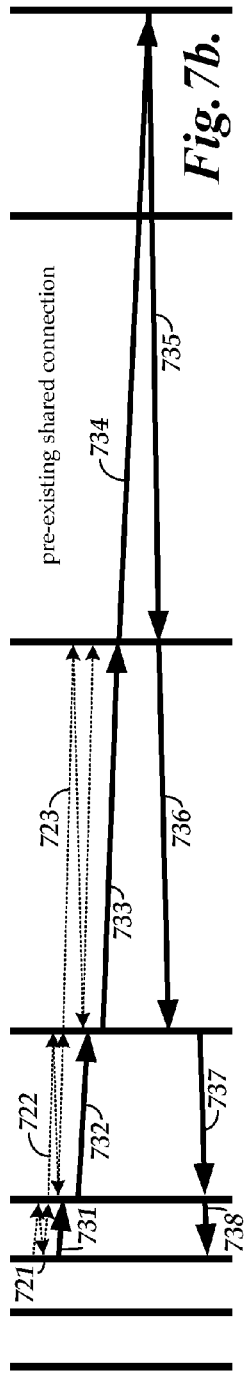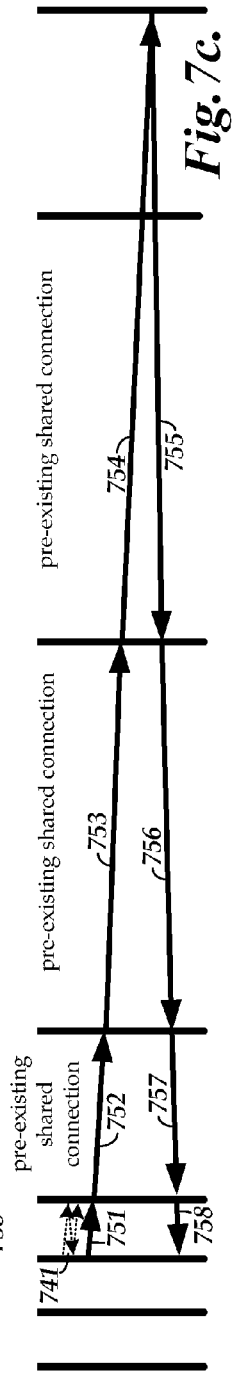

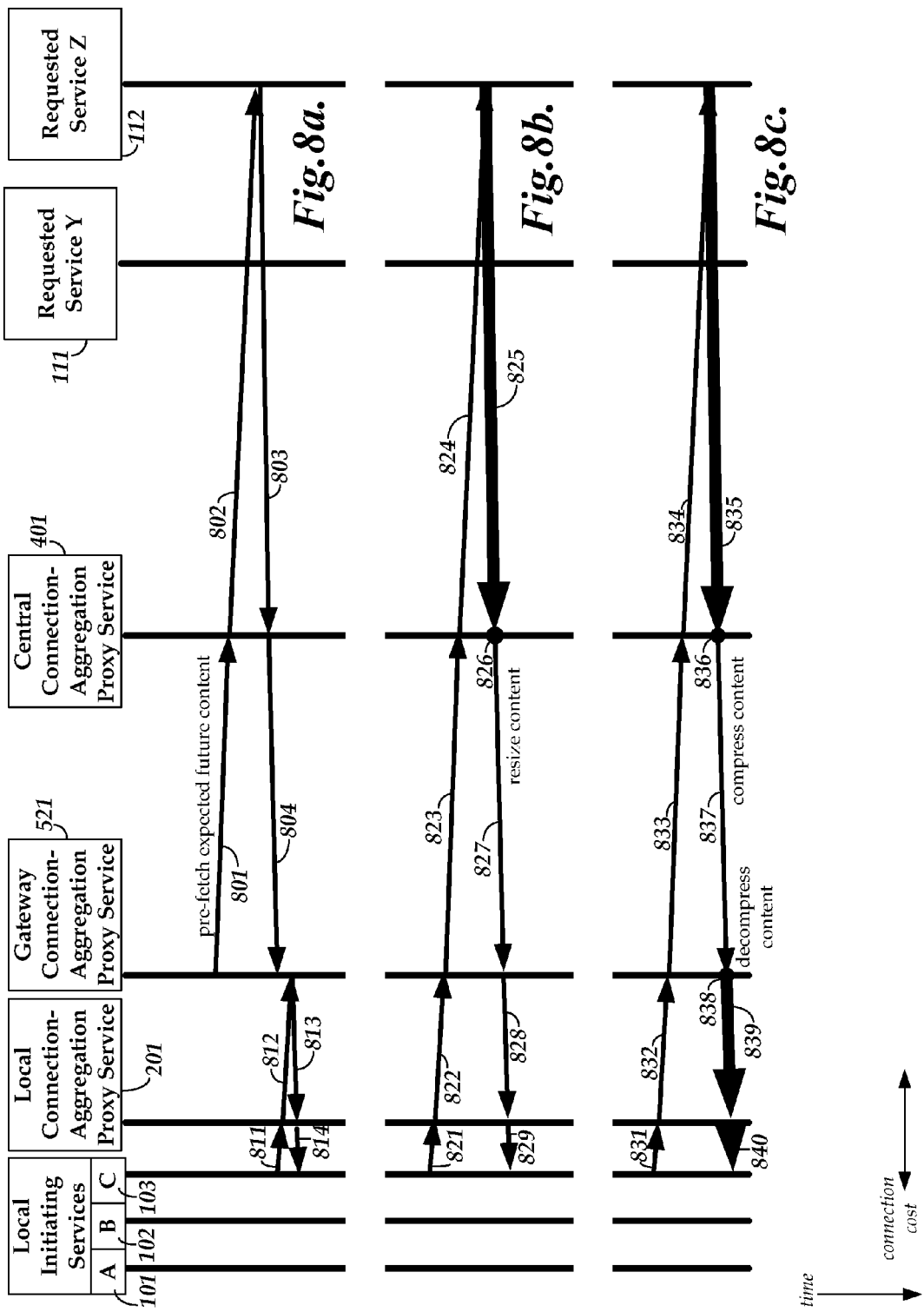

CONNECTION-AGGREGATION PROXY SERVICE

BACKGROUND

Networked computing devices often include a number of local software services that initiate communications with external requested services. For example, a web browser may initiate communications with a variety of Internet hosts in order to retrieve various elements referenced in a web page. As another example, an email client may initiate communications with an email server. As another example, an online multiplayer computer game may initiate communications with a gaming server. Such network communications often involve establishing, utilizing, and then terminating a network connection between a local initiating service and an external requested service. Establishing a network connection may require significant overhead, such as delay and resource consumption introduced by the processes of connection establishment and connection, connection acknowledgement, and connection termination. Multiple local initiating services may establish network connections to the same requested service, increasing bandwidth and delays in communications between the physical computing device executing the local initiating services, and the physical computing device executing the requested services.

BRIEF DESCRIPTION OF DRAWINGS

The accompanying drawings, which are incorporated in and form a part of this specification, illustrate example embodiments of the inventive subject matter, and in no way limit the scope of protection. The accompanying drawings include examples of possible graphical user interfaces for use with the disclosed system and methods. Other embodiments are contemplated using alternate hardware and/or software platforms, and using significantly different interfaces. The accompanying drawings illustrate embodiments wherein:

FIGS. 7a-7c illustrate communications flows involving local initiating a local initiating service, a local connection-aggregation proxy service, a gateway-connection aggregation service, a central connection-aggregation proxy service, and a requested service.

FIG. 8a illustrates a communications flow involving local initiating a local initiating service, a local connection-aggregation proxy service, a gateway-connection aggregation service, a central connection-aggregation proxy service, and a requested service, with the gateway-connection aggregation proxy service pre-fetching expected future content from a requested service.

FIG. 8b illustrates a communications flow involving local initiating a local initiating service, a local connection-aggregation proxy service, a gateway-connection aggregation service, a central connection-aggregation proxy service, and a requested service, with the central connection-aggregation proxy service resizing content.

FIG. 8c illustrates a communications flow involving local initiating a local initiating service, a local connection-aggregation proxy service, a gateway-connection aggregation service, a central connection-aggregation proxy service, and a requested service, with the central connection-aggregation proxy service compressing content and the gateway connection-aggregation proxy service decompressing the content.

DETAILED DESCRIPTION

Figure 1:
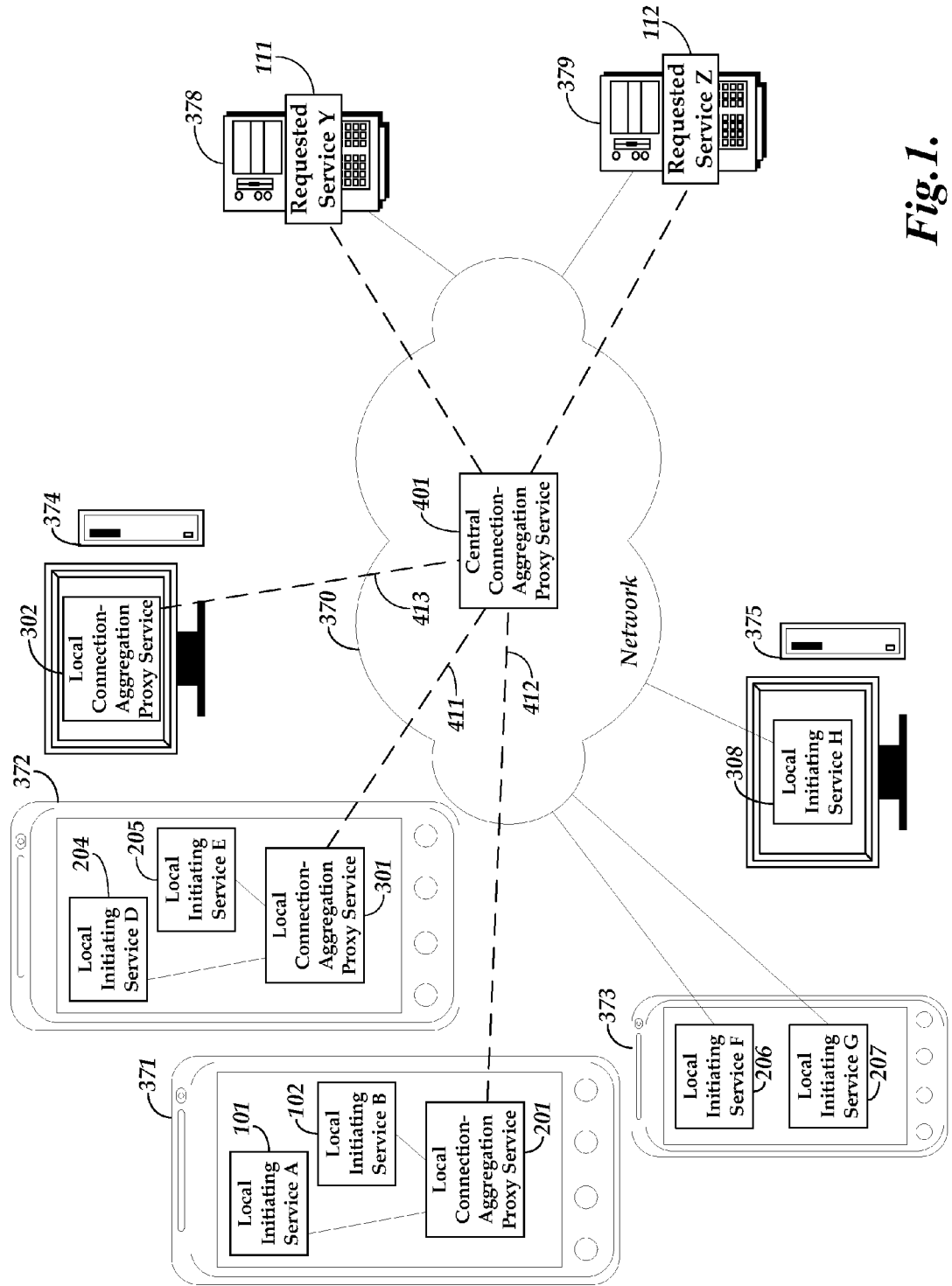
FIG. 1 depicts a system including local connection-aggregation proxy services, local initiating services, a central connection-aggregation proxy service, and requested services.

The use of end-to-end network connection protocols such as the Transmission Control Protocol ("TCP") may result in connections that are redundant of each other over at least part of a communications path. For example, multiple software services operating on a single device may open separate connections with a single target service. The resulting data path may be redundant for the entire portion of the connections between the device and the target service. As another example, multiple user devices on a local area network ("LAN") may open separate connections with a single target service. The resulting data path may be redundant for the entire portion of the connections between a shared gateway on the LAN and the target service.

The use of one or more connection-aggregation proxy services reduces connection redundancy by providing services at the ends of a connection with what appears to be an end-to-end connection, while the connection is in fact aggregated, for some portions, with other connections. In some embodiments, multiple connections are aggregated into a single connection, and communications from the distinct connections have different tags applied.

The use of connection-aggregation proxy services may provide additional networking efficiency benefits, such as through resizing or compressing content. Alternatively or additionally, a connection-aggregation proxy service may pre-fetch, push, or hint content to other services on a network. This may provide improved networking performance for networking services, without requiring any revision to those services. For example, all outbound network connections from a plurality of mobile networking devices may be aggregated at a single, central connection-aggregation proxy server through the use of a local connection-aggregation proxy server on each device. This presents advantages of reduced networking congestion windows, reduced transmission latency, lower transmission overhead, higher throughput, dynamic content adjustment, and intelligent tiered content caching.

In one example, a local connection-aggregation proxy service runs on the same physical computing device as various local initiating services. A first local initiating service transmits a connection establishment request for an external requested service. The local connection-aggregation proxy receives the connection establishment request and establishes a first local connection with the first local initiating service. The local connection-aggregation proxy also establishes an external connection with the external requested service. When the first local initiating service transmits a packet over the first local connection, the local-connection aggregation proxy acts as a proxy and relays the packet to the external requested service using the external connection.

A second local initiating service then transmits a connection establishment request for the same external requested service. The local connection-aggregation proxy receives the connection establishment request and establishes a second local connection with the second local initiating service. The local connection-aggregation proxy recognizes that it already has an active connection with the external requested service, and therefore does not establish a new external connection with the external requested service in response to receiving the request from the second local initiating service. When the second local initiating service transmits a packet over the second local connection, the local-connection aggregation proxy acts as a proxy and relays the packet to the external requested service using the external connection.

If one of the local initiating services terminates its associated local connection with the local connection-aggregation proxy service, the local connection-aggregation proxy service will continue to maintain its external connection if there is still at least one local connection with a local initiating service.

In another example, local connection-aggregation proxy services operating on different physical computing devices communicate with a single central connection-aggregation proxy service. The central connection-aggregation proxy service acts as a further connection aggregator, establishing connections with multiple local connection-aggregation proxy services seeking to communicate with the same external requested service, and relaying packets from the multiple local connection-aggregation proxy services over a single outbound connection to the external requested service.

In another example, a connection-aggregation proxy service operates at a network edge point between a plurality of physical computing devices, each executing one or more local initiating services, and an external requested service. The connection-aggregation proxy service acts as a gateway connection-aggregation proxy service, relaying requests from a plurality of physical computing devices to an external requested service, using a single outbound connection to the external requested service.

In certain embodiments, connection-aggregation proxy services provide efficient network communication by reducing the number of network connections between two devices. This may reduce congestion windows, reduce the amount of connection establishment communications, and reduce the amount of connection termination communications. Such reductions may save processing power, reduce network bandwidth, reduce latency, reduce packet loss, and present other advantages. In other embodiments, connection-aggregation proxy services resize and/or compress content communicated over a network connection thereby further reducing bandwidth usage. In yet other embodiments, connection-aggregation proxy services transmit content before it is requested based on an expectation that the content may be requested.

Initiating Services and Requested Services

Figure 2:
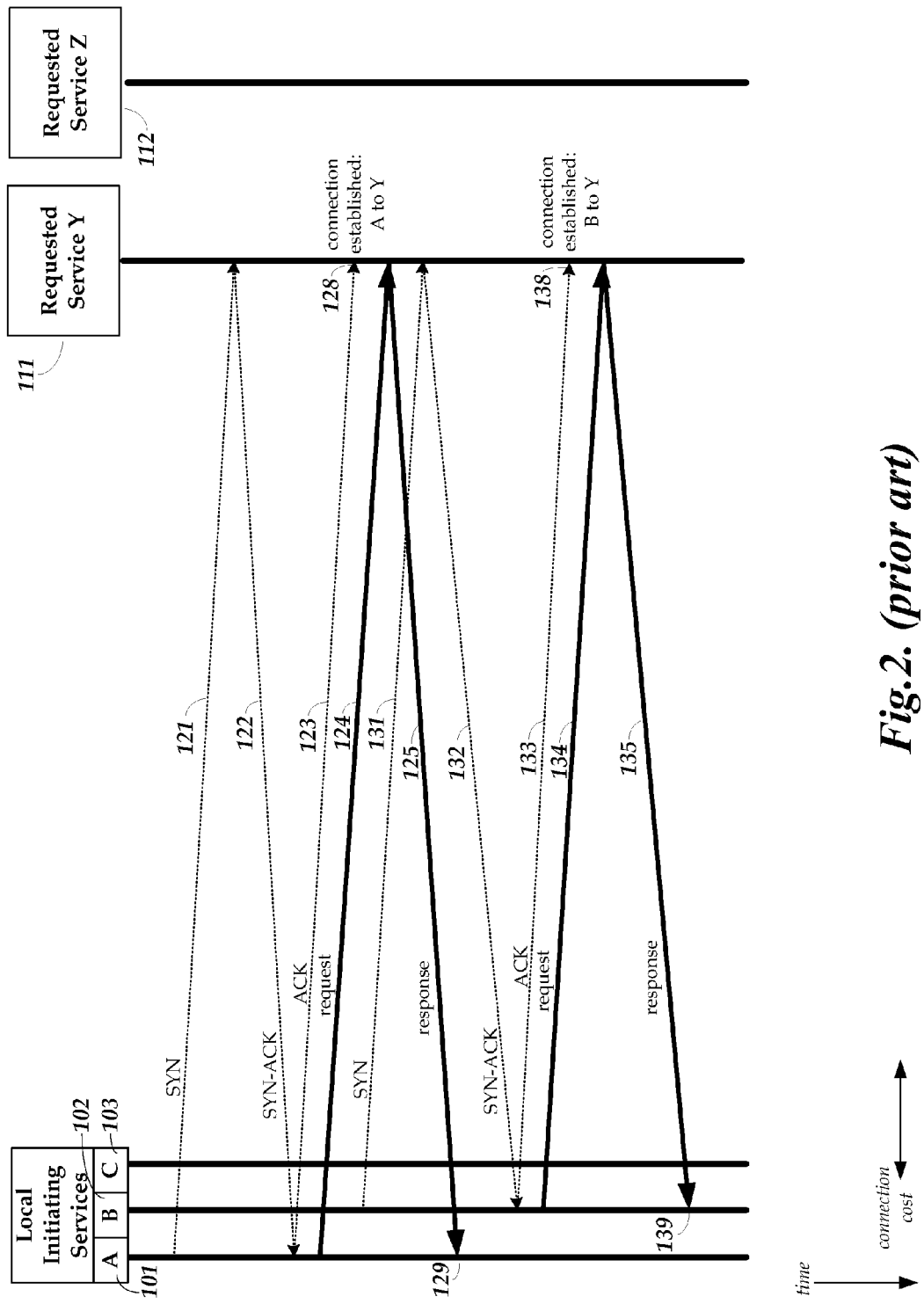
FIG. 2 illustrates a prior art communications flow between local initiating services and a requested service.

Referring to FIG. 2, an illustration is provided of existing networking communications technology which is relevant to the disclosure herein. As shown by the legend at the lower left corner of the figure, the Y axis of the figure represents the flow of time, with later times occurring below earlier times; the X axis of the figure represents connection cost. Connection cost may be measured in one or more units, such as bandwidth costs, time delays, network latency, packet loss, physical distance of network connections, monetary cost associated with transmissions, or any combination thereof.

A physical computing device includes three local initiating services, local initiating service A 101, local initiating service B 102 and local initiating service C 103. There are also shown two requested services, requested service Y 111, and requested service Z 112. Local initiating service A 101 seeks to establish a network connection with requested service Y 111.

Local initiating service A 101 transmits a connection establishment request 121 to requested service Y 111. In the present example, the connection establishment request 121 is a Transmission Control Protocol ("TCP") SYN packet, and includes a source protocol address associated with the physical computing device executing local initiating service A, and a target protocol address associated with the physical computing device executing requested service Y 111. Requested service Y 111 receives the connection establishment request 121 and transmits a request acknowledgement 122. In the present example, the request acknowledgement 122 is a TCP SYN-ACK packet, and includes a source protocol address associated with the physical computing device executing requested service Y 111, and a target protocol address associated with the physical computing device executing local initiating service A 101. Local initiating service A 101 receives the request acknowledgment 122 and transmits a connection acknowledgement 123. In the present example, the request acknowledgement 123 is a TCP ACK packet. The requested service Y 111 receives 128 the connection acknowledgement 123 and a connection is established between local initiating service A 101 and requested service Y.

After transmitting the connection acknowledgment 123, local initiating service A 101 transmits a request 124. For example, a request may include one or more packets containing a HyperText Transfer Protocol ("HTTP") GET request. The request 124 is transmitted over the established connection between local initiating service A 101 and requested service Y 111. It will be understood in the present illustration that dotted-line arrows represent communications at a lower layer in a network protocol stack than do solid-line arrows. The requested service Y 111, which may be a web server, responds to the request with a response 125. For example, the response may include one or more packets containing an HTTP payload in response to the HTTP GET request. The response 125 is transmitted over the established connection between local initiating service A 101 and requested service Y 111. The response 125 is received 129 at local initiating service A 101.

While local initiating service A 101 and requested service Y 111 are communicating with each other, local initiating service B 102 initiates communications with requested service Y 111. Local initiating service B 102 is a separate process operating on the same physical computing device as local initiating service A 101. Local initiating service B transmits a connection establishment request 131 to requested service Y 111, receives a request acknowledgement 132 from requested service Y 111, and transmits a connection acknowledgement 133 to requested service Y 133. The requested service Y 111 receives 138 the connection acknowledgement 133 and a connection is established between local initiating service B 102 and requested service Y 111.

At that time, there are two active networking connections between the physical computing device operating local initiating services A and B, and the physical computing device operating requested service Y. Local initiating service B 102 transmits a request 134 over the network connection between it and requested service Y 111. Requested service Y 111 transmits a response to local initiating service B 102 over the same network connection. The request 135 is received 139 at local initiating service B 102.

Local Connection-Aggregation Proxy Service

Figure 3:
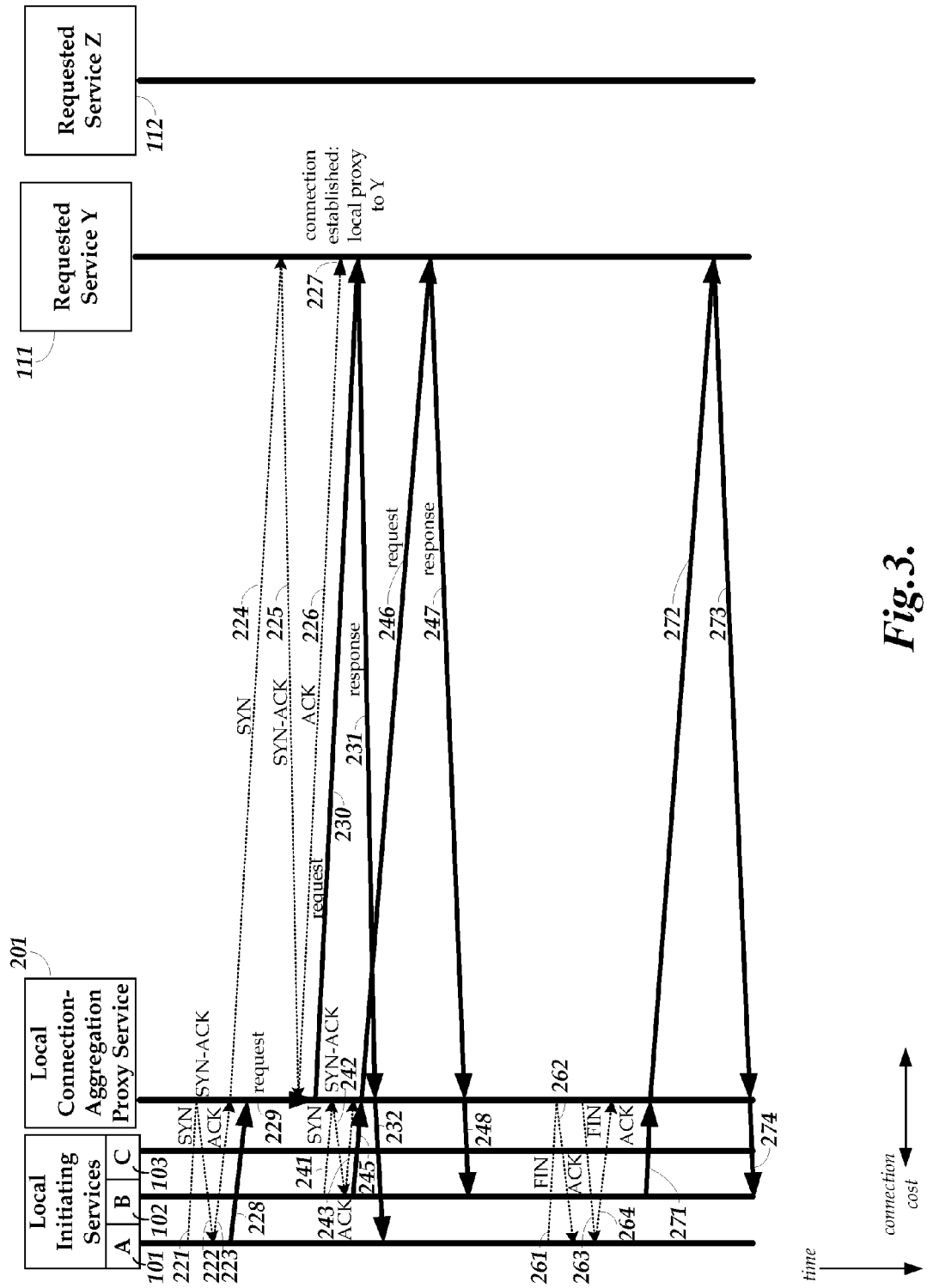
FIG. 3 illustrates a communications flow between local initiating services and a requested service using a local connection-aggregation proxy service between them.

Referring to FIG. 3, an embodiment is shown including a local connection-aggregation proxy service 201. The embodiment also includes many of the components found in FIG. 2. However, the presence of the local connection-aggregation proxy service 201 results in more efficient network communications than those illustrated in FIG. 2.

Referring again to FIG. 3, Local initiating service A 101 transmits a connection establishment request 221. The connection establishment request 221 includes a protocol address of the physical computing device executing local initiating service A 101 as a source protocol address, and a protocol address of the physical computing device executing requested service Y 111 as a target protocol address. Local initiating service A 101 may transmit the connection establishment request 221 by placing it on a local network stack, for example. This may be performed with the intent of having the connection establishment request 221 received and transmitted by a network interface of the physical computing device executing local service A 101.

In the illustrated embodiment the local connection-aggregation proxy service 201 receives the connection establishment request 221. For example, the local connection-aggregation proxy service 201 may listen on the local network stack and may perform packet manipulation on the connection establishment request 221 before it can be received by a network interface. As one example, a local connection-aggregation proxy service operating on a Linux operating system may include and/or interconnect with one or more of the Linux modules netfilter and iptables. In that example, the local connection-aggregation service 201 may add an IP Masquerade and/or Redirect rule to a network packet processing module such as netfilter or iptables.

The local connection-aggregation proxy service 201 responds to the connection establishment request 221 by transmitting a request acknowledgement 222. The request acknowledgement in the current example includes a protocol address of the physical computing device executing the requested service Y 111 as a source protocol address, and a protocol address of the physical computing device executing the local initiating service A 101 as a target protocol address. The local connection-aggregation proxy service 201 may obtain these protocol addresses from the connection establishment request 221. The local-connection aggregation proxy service 201 may use a source protocol address that is not associated with the hardware upon which the local connection-aggregation proxy service is executing.

The local initiating service A 101 receives the request acknowledgement 222 and transits a connection acknowledgment 223. The connection acknowledgement 223 in the current example includes a protocol address of the physical device executing the local initiating service A 101 as a source protocol address, and a protocol address of the physical device executing the requested service Y 111 as a target protocol address. The connection acknowledgment 223 is received by the local connection-aggregation proxy service 201 and a connection is established between the local initiating service A 101 and the local connection-aggregation proxy service 201.

The local connection-aggregation proxy service 201 transmits a connection establishment request 224 to the requested service Y 111. In the present example, the connection establishment request 224 is transmitted in response to the receipt of the connection acknowledgement 223. In another example, the connection establishment request 224 is transmitted in response to the receipt of the connection request 221. The connection establishment request 224 in the current example includes a protocol address associated with the physical device executing the local connection-aggregation proxy service 201 as a source protocol address, and includes a protocol address associated with the physical device executing the requested service Y 111 as a target protocol address.

The requested service Y 111 receives the connection establishment request 224 and transmits a request acknowledgment 225. The request acknowledgment 225 in the current example includes a protocol address associated with the physical device executing the requested service Y as a source protocol address, and includes a protocol address associated with the physical device executing the local connection-aggregation proxy service 201 as a target protocol address.

The local connection-aggregation proxy service 201 receives the connection acknowledgement 225 and transmits a connection acknowledgement 226. The connection acknowledgement 226 in the current example includes a protocol address associated with the physical device executing the local connection-aggregation proxy service 201 as a source protocol address, and a protocol address associated with the physical device executing the requested service Y 111 as a target protocol address. The requested service Y 111 receives 227 the connection acknowledgement 226 and a connection is established between the local connection-aggregation proxy service 201 and the requested service Y 111. The present embodiment utilizes this connection as a shared connection and aggregates connections between the local connection-aggregation proxy service 201 and one or more local initiating services, so that packets transmitted from a local initiating service, targeted to the requested service Y 111, are transmitted over that shared connection.

Local initiating service A initiates a request 228 that it transmits over the connection between local initiating service A and the local connection-aggregation proxy service 201. In the present example, the local connection-aggregation proxy service 201 receives the request 228 before it has completed establishing a connection with the requested service Y. Thus, the local connection-aggregation proxy service 201 cannot yet relay the request 228 to the requested service Y. The reason for this delay may be that communications between the local connection-aggregation proxy service 201 and the requested service Y take much longer than communications between a local initiating service and the local connection-aggregation proxy service 201. This may be a result of the local initiating services and the local connection-aggregation service 201 operating on the same physical computing device, and communications between them not being subject to inter-device networking delays. In the present example, the local connection-aggregation proxy service 201 stores the request 229 until a connection is available between the local connection-aggregation proxy service 201 and the requested service Y 111. Such storage may occur in a temporary cache, for example.

Once a connection between the local connection-aggregation proxy service 201 and the requested service Y 111 is established, the local connection-aggregation proxy service 201 transmits the request 230 to the requested service Y 111, over that established connection. Requested service Y 111 responds to the request with a response 231. The local connection-aggregation proxy service 201 receives the response 231 and relays it to the local initiating service A 232.

While this communication is occurring between local initiating service A 101 and the requested service Y 111, local initiating service B 102 also seeks to communicate with requested service Y 111. Local initiating service B 102 transmits a connection establishment request 241 that is handled by the local connection-aggregation proxy service in the manner discussed above in connection with the connection establishment request 221 previously transmitted by local initiating service A 101. This includes the transmission of a request acknowledgement 242 and a connection acknowledgement 243. This establishes a connection between local initiating service B 102 and the local connection-aggregation proxy service 201. From the local initiating service's perspective in the network communications, it is unable to tell that the connection is actually with the local connection-aggregation proxy service 201 rather than the requested service Y 111. The local connection-aggregation service 201 recognizes that it has an active connection with requested service Y 111. Thus, in the present example, the local connection-aggregation proxy service 201 does not establish a new connection with requested service Y 111 in response to having established a connection with local initiating service B 102.

Local initiating service B 102 transmits a request 245 over the connection between local initiating service B and the local connection-aggregation proxy service 201. The local connection-aggregation proxy service 201 receives the request and relays it to the requested service Y 111 by transmitting it 246 across the existing connection between the local connection-aggregation proxy service 201 and the requested service Y 111. The requested service Y 111 transmits a response 247 in response to receiving the request 246. The response 247 includes a protocol address of the physical computing device executing the requested service Y 111 as a source protocol address, and includes a protocol address of the physical computing device executing the local connection-aggregation proxy service 201 as a target protocol address. The local connection-aggregation proxy service 201 receives the response 247 and relays it to the local initiating service B 102, by transmitting it to the local initiating service B 102 over the connection between the local initiating service B 102 and the local connection-aggregation proxy service 201.

In the example of FIG. 3, at a later point in time, local initiating service A seeks to terminate its connection with the local connection-aggregation proxy service 201. It will be understood that, although this connection is referred to as being with the local connection-aggregation proxy service 201, from the networking perspective of the local initiating service A 101, the connection appears to be with the requested service Y 111. For example, this is because the local connection-aggregation proxy service 201 uses a protocol address associated with requested service Y 111 in communications that it transmits over the connection with local initiating service B 102.

Local initiating service A 101 initiates a connection termination by transmitting a connection termination request 261. In this example, the connection termination request 261 is a TCP FIN packet. The local connection-aggregation proxy service 201 receives the connection termination request 261 and transmits a connection termination acknowledgement 262, to the local initiating service A, in response. In this example, the connection termination acknowledgement 262 is a TCP ACK packet. The local connection-aggregation proxy service 201 also transmits a connection termination request 263, to local initiating service A, in response. Upon receiving the connection termination request 263 from the local connection-aggregation proxy service 201, the local initiating service B 102 transmits a connection termination acknowledgement 264 to the local connection-aggregation proxy service 201. This terminates the connection between the local initiating service A 101 and the local connection-aggregation proxy service 201.

The local connection-aggregation proxy service 201 determines whether it should maintain its connection with the requested service Y 111 now that the connection between the local initiating service A 101 and the local connection-aggregation proxy service 201 has been terminated. It will be understood that the connection between the local initiating service A and the local connection-aggregation proxy service 201 was associated with requested service Y 111. For example, the local connection-aggregation proxy service 201 may have recorded data to track the connection as being associated with requested service Y 111. The local connection-aggregation proxy service 201 identifies an active connection between itself and local initiating service B 102, with that active connection being associated with requested service Y 111. The local connection-aggregation proxy service determines not to terminate its connection with requested service Y 111.

Local initiating service B 102 transmits a request 271 for requested service Y 111, over the connection between the local initiating service B 102 and the local connection-aggregation proxy service 201. The local connection-aggregation proxy service 201 receives the request and relays it to the requested service Y 111 by transmitting it 272 over the active connection between the local connection aggregation proxy service 201 and the requested service Y 111. It will be understood that references to relaying a received packet include using the received packet to create a new packet and transmitting the new packet. For example, the payload of the received packet may be copied into a packet with different packet headers, and that packet with the different packet headers may be transmitted to another device.

The requested service Y 111 receives the request 272 and transmits a response 273. The local connection-aggregation proxy service 201 receives the response 273 and relays the response to the local initiating service B 102.

In one embodiment, a connection-aggregation proxy service receives a plurality of connection requests and responds to at least all of those requests that are unsecured. The connection-aggregation service has access to a data store of security certificates. When a secured request is received, the connection-aggregation proxy service determines whether it has access to a security certificate corresponding to the target of the request. If the connection-proxy aggregation service does have access to a security certificate corresponding to the target of the request, then the connection-aggregation proxy service uses the security certificate in responding to the connection request. If the connection-proxy aggregation service does not have access to a security certificate corresponding to the target of the request, then it forwards the request on towards its target. For example, a connection-aggregation security may respond to requests for Transport Layer Security (TSL) and/or Secure Sockets Layer (SSL) connections if it has access to corresponding security certificates.

Network Architecture

Figure 4:
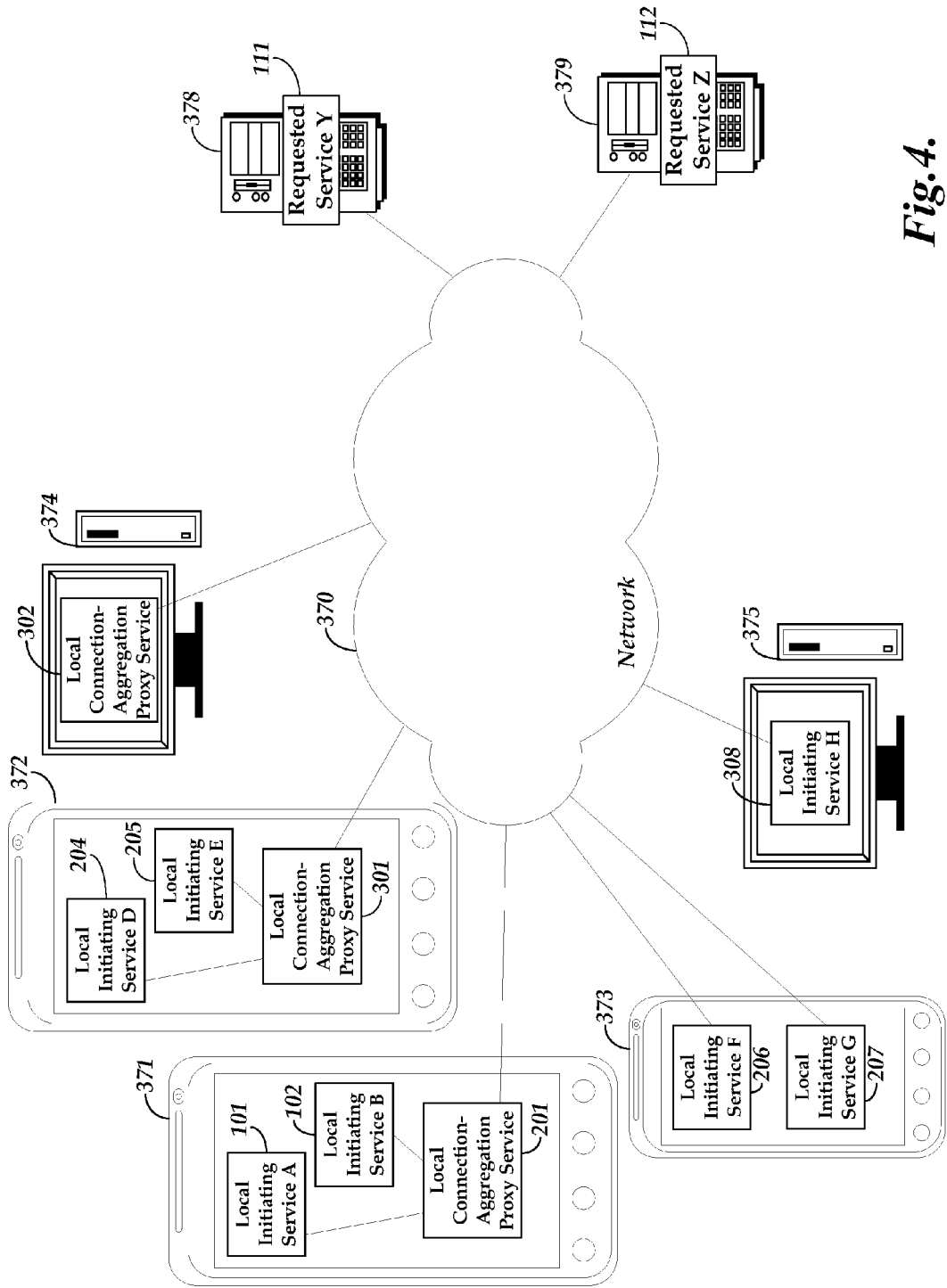
FIG. 4 depicts a system including local connection-aggregation proxy services, local initiating services, and requested services.

Referring to FIG. 4, an example network architecture is shown including a system for providing efficient network communications using local connection-aggregation proxy services. The local connection-aggregation proxy service 201 previously discussed, in combination with local initiating service A 101 and local initiating service B 102 are executing on a mobile computing device 371. It will be understood that embodiments of the disclosed system may include connection-aggregation proxy services that are configured to operate on any of a number of devices, including personal computers, laptops, servers, tablets, smartphones, personal digital assistants, routers, switches, gateways, and other computing devices.

The mobile computing device 371 is in communication with a network 370. In one example, the network 370 is the Internet, and the mobile computing device 371 is in communication with the Internet using an 802.11 protocol, a cellular data protocol, a wired connection protocol such as Ethernet, and/or some other communication protocol. A connection between the local connection-aggregation proxy service 201 may occur at a higher network layers, such as a transport control layer, as compared to the network communication layer at which the mobile computing device 371 is in communication with the network 370. As previously discussed, the local connection-aggregation proxy service 201 aggregates connections so that packets from local initiating service A and local initiating service B share are transmitted by the mobile computing device 371 across a single transport layer connection with the requested service Y, when both local initiating service A and local initiating service B target requests for requested service Y.

Requested service Y is shown executing on physical server hardware 378. Requested service Z 112 is shown executing on physical server hardware 379. In other embodiments, a requested service may execute on a distributed set of server hardware, such as a virtualized or cloud-based server.

Another mobile computing device 372 is executing a local connection-aggregation proxy service 301 that aggregates connections from local initiating service D 204 and local initiating service E 205. Another local connection-aggregation proxy service 302 is executing on a personal computer 374, and aggregates connections from local initiating services executing on the personal computer 374.

A mobile computing device 373 includes local initiating service F 206 and local initiating service G 207, however the mobile computing device 373 does not include a local connection-aggregation proxy service. As a result, local initiating service F 206 and local initiating service G 207 create redundant network connections in order for each to communicate with requested service Y 111. Similarly, a desktop computing device 375 is executing a local initiating service H 308 but is not executing a local connection-aggregation proxy service.

Central Connection-Aggregation Proxy Service

Referring to FIG. 1, another embodiment including connection-aggregation proxy services is shown. In the current embodiment, a central connection-aggregation proxy service 401 is shown. The central connection-aggregation proxy service services as an aggregator for other aggregators—that is, each of the other connection-aggregation proxy services 201, 301, and 302 establishes a connection, 411, 412, 413 with the central connection aggregation proxy service 401. The central connection-aggregation proxy service forms connections with requested services, such as requested service Y 111 and requested service Z 112.

In some embodiments, a local connection-aggregation proxy service is configured to form a connection with a central-connection aggregation proxy service before the local connection-aggregation proxy service receives any transmission from a local initiating service. This may provide the advantage of having a connection between the local connection-aggregation proxy service and the central connection-aggregation proxy service pre-established when a transmission is later received at the local connection-aggregation proxy service from a local initiating service. This may save delays resulting from needing to establish a connection between the local connection-aggregation proxy service and the central connection-aggregation proxy service on-demand. In another example, a connection between the local connection-aggregation proxy service and the central connection-aggregation proxy service is performed in an on-demand nature in order to avoid creating unnecessary connections.

In the embodiment of FIG. 1, the dashed lines 411, 412, 413 represent tunneled communications between the local connection-aggregation proxy services 201, 301, 302 and the central connection-aggregation proxy service 401. A tunneling protocol such as Layer 2 Tunneling Protocol ("LT2P") may be used in the communication between a local connection-aggregation proxy service and the central connection-aggregation proxy service.

In another embodiment, there are a plurality of central connection-aggregation proxy services. For example, there may be central connection-aggregation proxy services for different regions in order to further reduce network connection costs.

Gateway Connection-Aggregation Proxy Service

Figure 5:
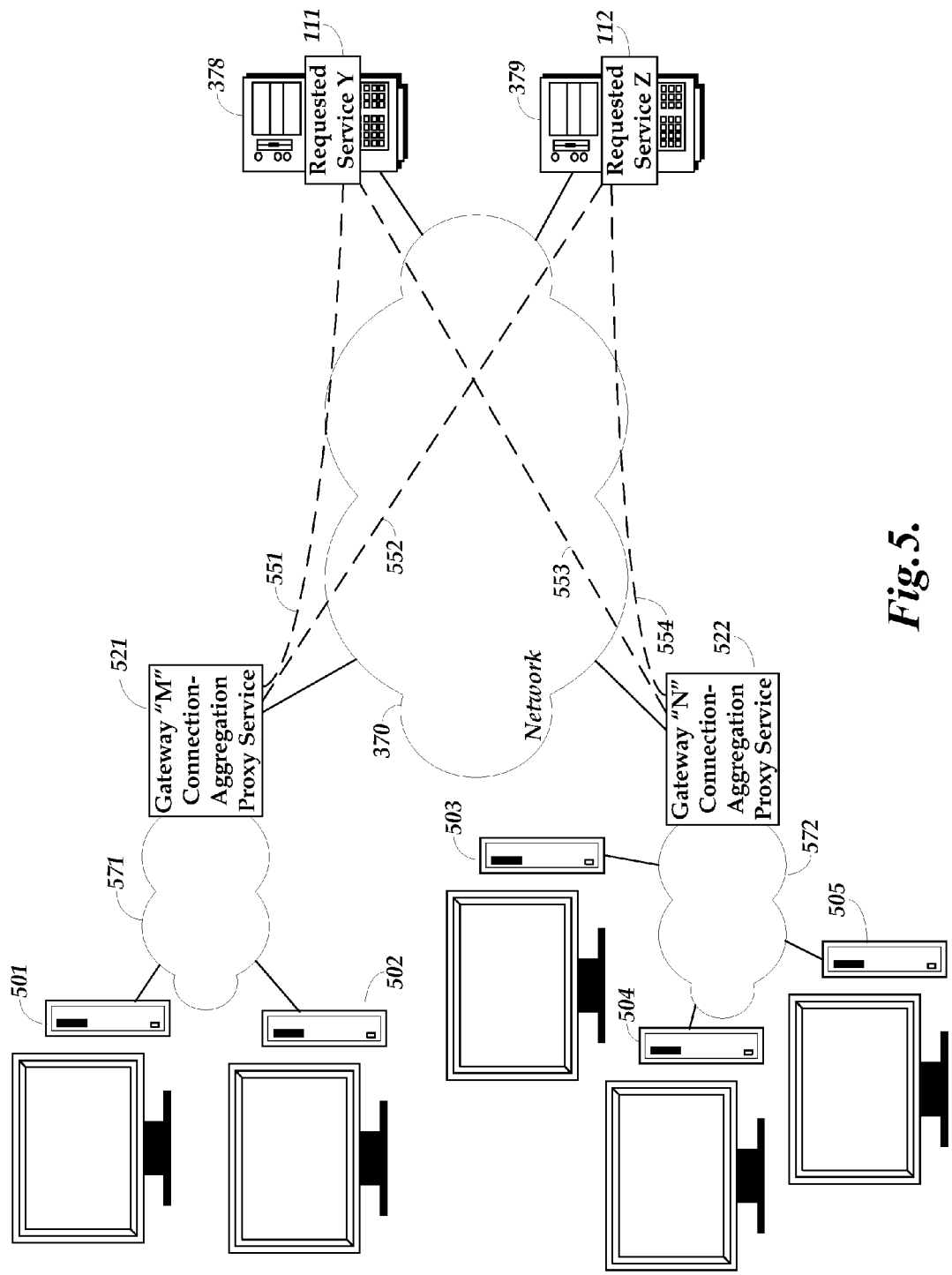
FIG. 5 depicts a system including gateway connection-aggregation proxy services and requested services.

In FIG. 5, another network architecture including connection-aggregation proxy services is shown. In this example, there are a number of computing devices 501, 502, 503, 504, and 505, none of which include a local connection-aggregation proxy service. The computing devices are connected to networks 571, 572 through which they access a larger external network 370, in order to reach requested services 111, 112. Two gateway connection-aggregation proxy services 521, 522 are shown. In this example, a gateway connection-aggregation proxy service is located at a network edge location such that network communications pass through the gateway connection-aggregation proxy service in order to reach external network locations. The gateway connection-aggregation proxy service is thereby able to capture and aggregate network communications that are outbound from the network that the gateway sits at the edge of.

For example, the gateway M connection-aggregation proxy service 521 sits in the stream of network communications between devices on one local area network ("LAN") 571 and devices on a wide area network ("WAN") 370. Thus, the gateway M connection-aggregation proxy service 521 receives connection requests transmitted from computing devices 501 and 502, targeted to requested service Y 111 and requested service Z 112. The gateway M connection-aggregation proxy establishes connections with computing devices located on its LAN side in response to receiving requests from those devices for an external service. The gateway M connection-aggregation proxy service 521 also forms connections 551, 552 on its WAN side between itself and services that have been requested by computing devices 501, 502 on the gateway's LAN side. The gateway M connection-aggregation proxy service 521 thereby aggregates multiple connection requests, for a particular requested service, that originate from devices on the gateway's LAN side, into a single connection with that requested service, on the gateway's WAN side.

As illustrated, gateway N connection-aggregation proxy service 552 provides a similar connection aggregation for devices on the LAN 572, including computing devices 503, 504 and 505. The gateway N connection-aggregation proxy service 552 forms connections 553, 554 with requested services Y and Z.

Multi-Layered Connection-Aggregation Proxy Services

Other embodiments may include various combinations and permutations of different connection-aggregation proxy services. For example, referring to FIG. 6, a system is shown that includes two gateway connection-aggregation proxy services 521, 522. The system also includes a central connection-aggregation proxy service 401. The system also includes local connection-aggregation proxy services 603, 604 operating on some of the illustrated computing devices 503, 504. Other computing devices 501, 502 and 505 are not operating local connection-aggregation proxy services. Those other computing devices 501, 502 and 505 are attached to local area networks 511, 512, which result in their traffic to a WAN 370 being received by one of the gateway connection-aggregation proxy services 521, 522. The local connection-aggregation proxy services 603, 604 establish tunnel connections to the gateway N connection-aggregation proxy service 522. Each of the gateway connection aggregation proxy services 521, 522 establish tunnel connections to the central connection-aggregation proxy service 401. The central connection-aggregation proxy service 401 forms connections with requested services 111, 112.

Figure 6:
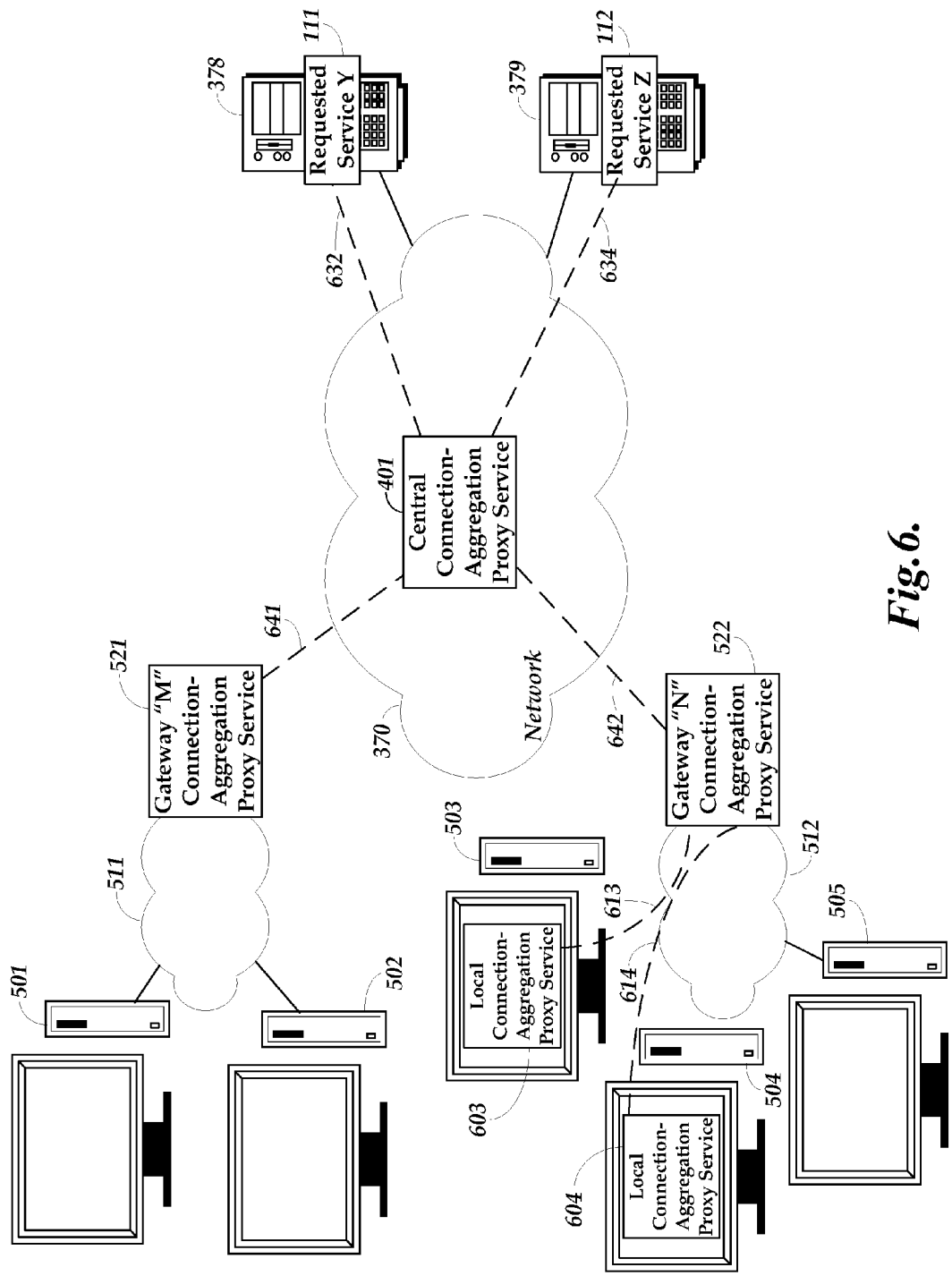
FIG. 6 depicts a system including gateway connection-aggregation proxy services, local connection-aggregation proxy services, a central connection-aggregation proxy service, and requested services.

FIGS. 7*a*-7*c* illustrate various communications flows amongst some of the components of the system shown in FIG. 6. Referring to FIG. 7*a*, local initiating service C 103 seeks to send a request to requested service Z 112. Local initiating service C first attempts to establish a transport layer connection between itself and requested service Z 112. Local initiating service C transmits a connection establishment request 701 which is received by the local connection-aggregation proxy service 201. A transport layer connection between local initiating service C and local connection-aggregation proxy service 201 is formed. It will be understood that, in this example, the transport layer connection is within a particular computing device. In one embodiment, the local connection-aggregation proxy service directs outbound network traffic within the device to the localhost protocol address in order to accomplish this.

The local connection-aggregation proxy service 201 does not have an active connection with requested service Z 112 when it establishes a connection with local initiating service C 103 where local initiating service C 103 is attempting to communicate with requested service Z 112. The local connection-aggregation proxy service 201 transmits a connection establishment request 702 that is received by a gateway connection-aggregation proxy service 521. The system forms a connection between the local connection-aggregation proxy service 201 and the gateway connection-aggregation proxy service 521. Similarly, the gateway connection-aggregation proxy service attempts to establish communication with the requested service Z 112 by transmitting a connection establishment request 703. That connection establishment request 703 is received by the central connection-aggregation proxy service 401. The system forms a connection between the gateway connection-aggregation proxy service 521 and the central connection-aggregation proxy service 401. The central connection-aggregation proxy service then attempts to establish communication with the requested service Z 112 by transmitting a connection establishment request 704. The system forms a connection between the central connection-aggregation proxy service 401 and the requested service Z 112.

With this chain of proxy connections established, a request from local initiating service C 103, is able to be relayed through the various connection-aggregation proxy services. The request 711 is transmitted from the local initiating service C to the local connection-aggregation proxy service 201. The request 702 is then transmitted from the local connection-aggregation proxy service to the gateway connection-aggregation proxy service 521. The request 703 is then transmitted from the gateway connection-aggregation proxy service to the central connection-aggregation proxy service 401. The request 704 is then transmitted from the central connection-aggregation proxy service 401 to the requested service Z 112. Requested service Z 112 responds with a response that flows back through the connections and connection-aggregation proxy services, 715, 716, 717, 718, before arriving at local initiating service C 103. The process occurs transparently to local initiating service C. Based on the response 718 including a source protocol address associated with the requested service Z 112, the local initiating service C is unable to detect that proxy services provided intermediate connections in the communications path.

Referring to FIG. 7*b*, the same devices and services as in FIG. 7*a* are shown. As with FIG. 7*a*, the local initiating service C 103 in FIG. 7*b* seeks to establish communications with the requested service Z 112. The only different from FIG. 7*a* is that, in FIG. 7*b*, there is a preexisting shared connection between the central connection-aggregation proxy service 401 and the requested service Z 112. As a result, there is one fewer connection needing established, and local initiating service C 103 receives the response 738 more quickly.

Referring to FIG. 7*c*, the same devices and services as in FIGS. 7*a*-*b* are shown. As with FIGS. 7*a*-*b*, the local initiating service C 103 in FIG. 7*c* seeks to establish communications with the requested service Z 112. The only different from FIG. 7*b* is that, in FIG. 7*c*, there is a preexisting shared connection between the gateway connection-aggregation proxy service 521 and the central connection-aggregation proxy service 401. As a result, there is one fewer connection needing established, and local initiating service C 103 receives the response 758 more quickly.

Content Pre-Fetch, Push, and Hinting

In certain embodiments, connection-aggregation proxy services provide additional functionality besides aggregating connections. For example, such functionality may include pre-fetching, pushing, and/or hinting at content. Referring to FIG. 8*a*, the gateway connection-aggregation proxy service 521 pre-fetches content from requested service Z 112 that it expects to receive a request for in the future. This expectation may be a result of observed trends in previous request patterns and/or observations regarding current network usage.

The gateway connection-aggregation proxy service 521 transmits a request 801 for the content. The request is relayed through the central connection-aggregation proxy service 401. Requested service Z 112 transmits a response 803 including the requested content. The response is relayed by the central connection-aggregation proxy service 401 and received 804 by the gateway connection-aggregation proxy service 521. Later, the local initiating service C transmits a request 811 for the content from requested service Z 112. The request is relayed by the local connection-aggregation proxy service 201 to the gateway connection-aggregation proxy service 521. The gateway connection-aggregation proxy service 521 recognizes that it has access to a cached copy of the requested content, as a result of having pre-fetched the expected content. The gateway connection-aggregation proxy service 521 transmits a request 813 including the requested content, to the local connection-aggregation proxy service 201. The request is relayed 814 to the local initiating service C 103.

In another example, a service pushes content to another service without the content being requested by the receiving service. For example, the central aggregation proxy service 401 may have a cached copy of certain content stored as a result of the central connection-aggregation proxy service 401 having relayed a request that it received for the content, from the gateway M connection-aggregation proxy service. The central connection-aggregation proxy service may determine that the gateway N connection-aggregation proxy service should receive a pushed copy of that content, despite the fact that the gateway N connection-aggregation proxy service has not transmitted a request for the content. The central connection-aggregation proxy service may therefore transmit a copy of the content to the gateway N connection-aggregation proxy service. In another example, a service transmits a hint to another service, with the hint identifying a particular content that the transmitting service recommends the receiving service send a request for. This may provide many of the advantages of pushed content, without forcing a receiving service to receive content that it determines it does not wish to receive.

Content Processing

In other examples, proxy services perform processing of content in order to provide efficient network communications. For example, referring to FIG. 8b, requested service Z 112 transmits a response 825 in response to having received a request 824. The central connection-aggregation proxy service 401 receives the response 825. The response 825 consists of a large volume of content data. The central connection-aggregation proxy service 401 determines that it will resize the content 826. One example of resizing content includes processing an image file in order to reduce its resolution. Another example of resizing content includes discarding portions of a lengthy HTML content file. The central connection-aggregation proxy service 401 may resize content based on a device attribute of the physical computing device that transmitted the relevant request. For example, the request 821, 822, 823, 824 may include an identification of the initiating device's screen resolution. The central connection-aggregation proxy service 401 may recognize that the image file in the response content is larger than the resolution that the initiating device is capable of displaying. The central connection-aggregation proxy service 401 may resize the image file in the response content in order to reduce the cost of transmitting an unnecessary amount of data.

As another example, proxy services may compress and decompress content. Referring to FIG. 8c, requested service Z 112 transmits a response 835 in response to having received a request 824. The central connection-aggregation proxy service 401 receives the response 835. The response 835 consists of a large volume of content data. The central connection-aggregation proxy service 401 determines that it will compress the content 836. One example of compressing content includes applying a lossless compression algorithm such as DEFLATE or LZW. The central connection-aggregation proxy service 401 compresses the content and transmits the compressed content 837. The gateway connection-aggregation proxy service 521 receives the compressed content 837 and decompresses it 838, for example by applying a decompression algorithm. The gateway connection aggregation proxy service 521 then transmits the decompressed content 839, which is relayed by the local connection-aggregation proxy service 201 and received by the local initiating service C 103.

Although compressing and decompressing content may incur additional computational cost upon the system, it may save network connection cost. The system may determine factors such as whether to perform compression/decompression, to what extent to compress and decompress, and at what points in the system to compress and decompress. These factors may be influenced by available computational resources and connection costs. For example, in the illustration of FIG. 8c, the compressed content could have been relayed by the gateway connection-aggregation proxy service 521 and later decompressed by the local connection-aggregation proxy service 201. This may have reduced network connection costs associated with transmitting the larger, decompressed data between the gateway connection-aggregation proxy service 521 and the local connection-aggregation proxy service 201. However, the system in FIG. 8c determined to instead decompress at the gateway connection-aggregation proxy service 521 because the gateway hardware executing the gateway connection-aggregation proxy service 521 has more computational power than the mobile device hardware executing the local connection-aggregation proxy service 201.

CONCLUSION

The connection-aggregation proxy system may be implemented as computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state.

Each of the services 101, 102, 103, 111, 112, 201, 204, 205, 206, 207, 301, 302, 308, 401, 521, 522, 603, and 604 shown in FIGS. 1-8c may be implemented in an appropriate combination of computer hardware and software, or in application-specific circuitry. For example, each such service may be implemented in service code executed by one or more physical servers or other computing devices. The service code may be stored on non-transitory computer storage devices or media. The various data repositories which may be used, for example, to cache pre-fetched content may include persistent data storage devices (hard drives, solid state memory, etc.) that store the disclosed data, and may include associated code for managing such data.

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for providing efficient network communications, the system comprising:
   a plurality of physical computing devices, each physical computing device configured to operate a local connection-aggregation proxy service; and
   a central connection-aggregation proxy service configured to communicate with each of the local connection-aggregation proxy services;
   wherein each local connection-aggregation proxy service is configured to:
   receive a first external network request from a first service operating on the same physical computing device as the respective local connection-aggregation proxy service and a second external network request from a second service operating on the same physical computing device as the respective local connection-aggregation proxy service,
   respond to the first external network request to form a first intra-device connection and to the second external network request to form a second intra-device connection,
   establish an external network connection to the central connection-aggregation proxy service in response to the first external network request,
   determine, based on the establishment of the external network connection to the central connection-aggregation proxy service, not to establish a second external network connection to the central connection-aggregation proxy service in response to the second external network request,
   relay messages received via the first intra-device connection to the central connection-aggregation proxy service over the external network connection,
   relay messages received via the second intra-device connections to the central connection-aggregation proxy service over the external network connection in response to the determination not to establish the second external network connection, and
   maintain the external network connection in response to a determination that at least one of the first intra-device connection or the second intra-device connection is still active.

2. The system of claim 1, wherein the central connection-aggregation proxy service is configured to receive information regarding an attribute of a first physical computing device in the plurality of physical computing devices, receive content from a service requested by a service operating on the first physical computing device, and resize the content based at least in part on the information regarding the attribute of the first physical computing device.

3. The system of claim 2, wherein the resized data comprises an image that was resized by reducing its resolution.

4. The system of claim 2, wherein the attribute of the first physical computing device is a screen resolution.

5. The system of claim 2, wherein the attribute of the first physical computing device is an amount of memory.

6. The system of claim 1, wherein:
- the local connection-aggregation proxy services are configured to establish receive Transmission Control Protocol connection requests with the first and second services; and
- the central connection-aggregation proxy service is configured to communicate with each of the local connection-aggregation proxy services using the Transmission Control Protocol.

7. The system of claim 1, wherein:
- the central connection-aggregation proxy service is configured to receive content from a requested service, compress the content, and transmit the compressed content to a local connection-aggregation service; and
- the local connection-aggregation service is configured receive the compressed content, decompress the content, and transmit the decompressed content to the first service.

8. The system of claim 1, wherein:
- the central connection-aggregation proxy service is further configured to transmit pushed content to a local connection-aggregation service that has not transmitted a request for the pushed content; and
- the local connection-aggregation proxy service is further configured to receive the pushed content; store the pushed content; and then provide the pushed content in response to a request from the first service.

9. The system of claim 1, wherein:
- the central connection-aggregation proxy service is further configured to transmit a hint regarding hinted content to a local connection-aggregation service that has not transmitted a request for the hinted content; and
- the local connection-aggregation proxy service is further configured to receive the hint regarding hinted content, determine whether to request the hinted content, request the hinted content from the central connection-aggregation service if a determination is made to do so, receive the hinted content from the central connection-aggregation service, and transmit the hinted content to the first service.

10. A non-transitory computer-readable medium having computer-executable instructions for performing a method for providing efficient network communications, the method comprising:
- receiving, at a local connection-aggregation proxy service, a first external network request originating from a first service and a second external network request originating from a second service, wherein the local connection-aggregation proxy service, the first service, and the second service are executed by a first computing device, and wherein the first and second external network requests are not targeted to the local connection-aggregation proxy service;
- establishing first and second internal network connections within the first computing device in response to the received first and second external network requests, wherein the established first internal network connection is between the local connection-aggregation proxy service and the first service and the established second internal network connection is between the local connection-aggregation proxy service and the second service;
- establishing an external network connection to a central connection-aggregation proxy service operating on a second computing device in response to the first external network request such that communications transmitted over the first internal network connection are subsequently transmitted over the external network connection, wherein the central connection-aggregation proxy service is configured to establish other external network connections with a plurality of local connection-aggregation proxy services;
- determining, based on the establishment of the external network connection to the central connection-aggregation proxy service, not to establish a second external network connection to the central connection-aggregation proxy service in response to the second external network request;
- transmitting, over the external network connection to the central connection-aggregation proxy service, communications sent over the second internal network connection in response to the determination not to establish the second external network connection; and
- maintaining, by the local connection-aggregation proxy service, the external network connection in response to a determination that at least one of the first internal network connection or the second internal network connection is still active.

11. The non-transitory computer-readable medium of claim 10, wherein the computer-readable medium is further configured to perform a method comprising:
- transmitting to the central connection-aggregation service data describing an attribute of the first computing device; and
- receiving resized data from the central connection-aggregation service, wherein the data was resized based at least in part on the attribute of the first computing device.

12. The non-transitory computer-readable medium of claim 11, wherein the resized data comprises an image that was resized by reducing its resolution.

13. The non-transitory computer-readable medium of claim 11, wherein the computer-readable medium is further configured to perform a method comprising:
- receiving pushed content from the central connection-aggregation service, wherein the pushed content was not requested;
- storing the pushed content;
- receiving, over the first internal connection, a request for the pushed content; and
- responding to the request by providing the pushed content.

14. The non-transitory computer-readable medium of claim 11 wherein the computer-readable medium is further configured to perform a method comprising:
- receiving from the central connection-aggregation service, a hint regarding hinted content;
- determining whether to request the hinted content;
- requesting the hinted content from the central connection-aggregation service;
- receiving the hinted content from the central connection-aggregation service;
- storing the hinted content;
- receiving, over the first internal connection, a request for the hinted content; and
- responding to the request by providing the hinted content.

15. The non-transitory computer-readable medium of claim 10, wherein the external network connection is established before the first and second internal network connections are established.

16. The non-transitory computer-readable medium of claim 10 wherein the external network connection is established in response to the first received external network request.

17. The non-transitory computer-readable medium of claim 10, wherein the first and second internal network connections are established using the Transmission Control Protocol.

18. A system for providing efficient network communications, the system comprising:
   memory configured to store program instructions; and
   a processor configured to execute the program instructions stored in the memory to implement:
      an incoming connection acceptance service configured to receive requests from connection-aggregation proxy services and establish connections with the connection-aggregation proxy services in response;
      a relay service configured to receive a packet transmitted over a connection with a first connection-aggregation proxy service, identify a target address associated with the packet, determine whether an existing connection is available to a device associated with the target address as a result of a packet received from a second connection-aggregation proxy service, determine not to establish a second connection to the device associated with the target address if the existing connection is available and transmit the packet over the existing connection in response to the determination not to establish the second connection, establish an outgoing connection with the device associated with the target address if the existing connection is not available, and maintain the existing connection to the device associated with the target address in response to a determination that at least one of a connection with the first connection-aggregation proxy service or a connection with the second connection-aggregation proxy service is still active; and
      a content manipulation service configured to receive content transmitted in response to the packet, identify content associated with the packet, and resize the content.

19. The system of claim 18, wherein the processor is further configured to implement:
   a secured connection service configured to receive a secured network connection request, determine whether a security certificate associated with the secured network connection request is available, and respond to the secured network connection request using the security certificate is available in order to establish a secured connection;
   wherein the secured network connection request conforms to a cryptographic protocol.

20. The system of claim 19, wherein the secured connection service is further configured to forward the secured network connection request to a target address of the secured network connection request if a security certificate associated with the secured network connection request is not available.

21. The system of claim 19, wherein the cryptographic protocol is the Stream Control Transmission Protocol.

22. The system of claim 19, wherein the cryptographic protocol is Transport Layer Security.

23. The system of claim 8, wherein the content manipulation service is further configured to resize the content based at least in part on an attribute of a device associated with a request for the content.

24. A method for providing efficient network communications, the method comprising:
   receiving, at a local connection-aggregation proxy service, a first external network request originating from a first service and a second external network request originating from a second service, wherein the local connection-aggregation proxy service, the first service, and the second service are executed by a first computing device, and wherein the first and second external network requests are not targeted to the local connection-aggregation proxy service;
   establishing first and second internal network connections within the first computing device in response to the received first and second external network requests, wherein the established first internal network connection is between the local connection-aggregation proxy service and the first service and the established second internal network connection is between the local connection-aggregation proxy service and the second service;
   establishing an external network connection to a central connection-aggregation proxy service operating on a second computing device in response to the first external network request such that communications transmitted over the first internal network connection are subsequently transmitted over the external network connection, wherein the central connection-aggregation proxy service is configured to establish other external network connections with a plurality of local connection-aggregation proxy services;
   determining, based on the establishment of the external network connection to the central connection-aggregation proxy service, not to establish a second external network connection to the central connection-aggregation proxy service in response to the second external network request;
   transmitting, over the external network connection to the central connection-aggregation proxy service, communications sent over the second internal network connection in response to the determination not to establish the second external network connection; and
   maintaining, by the local connection-aggregation proxy service, the external network connection in response to a determination that at least one of the first internal network connection or the second internal network connection is still active.

25. The method of claim 24 further comprising: receiving compressed content from the central connection-aggregation proxy service;
   decompressing the compressed content in order to form decompressed content; and transmitting the decompressed content to the first service.

26. The method of claim 24 further comprising:
   transmitting to the central connection-aggregation service data describing an attribute of the first computing device; and
   receiving resized data from the central connection-aggregation service, wherein the data was resized based at least in part on the attribute of the first computing device.

27. The method of claim 24 further comprising:
   receiving pushed content from the central connection-aggregation service, wherein the pushed content was not requested;
   storing the pushed content;
   receiving, over the first internal connection, a request for the pushed content; and responding to the request by providing the pushed content.

28. The method of claim 24, further comprising:
   receiving from the central connection-aggregation service, a hint regarding hinted content;
   determining whether to request the hinted content;
   requesting the hinted content from the central connection-aggregation service;
   receiving the hinted content from the central connection-aggregation service;

storing the hinted content;
receiving, over the first internal connection, a request for the hinted content; and
responding to the request by providing the hinted content.

* * * * *